Dec. 15, 1953     R. A. HANES ET AL     2,662,728
BRAKE PEDAL HOLDING DEVICE
Filed May 21, 1951
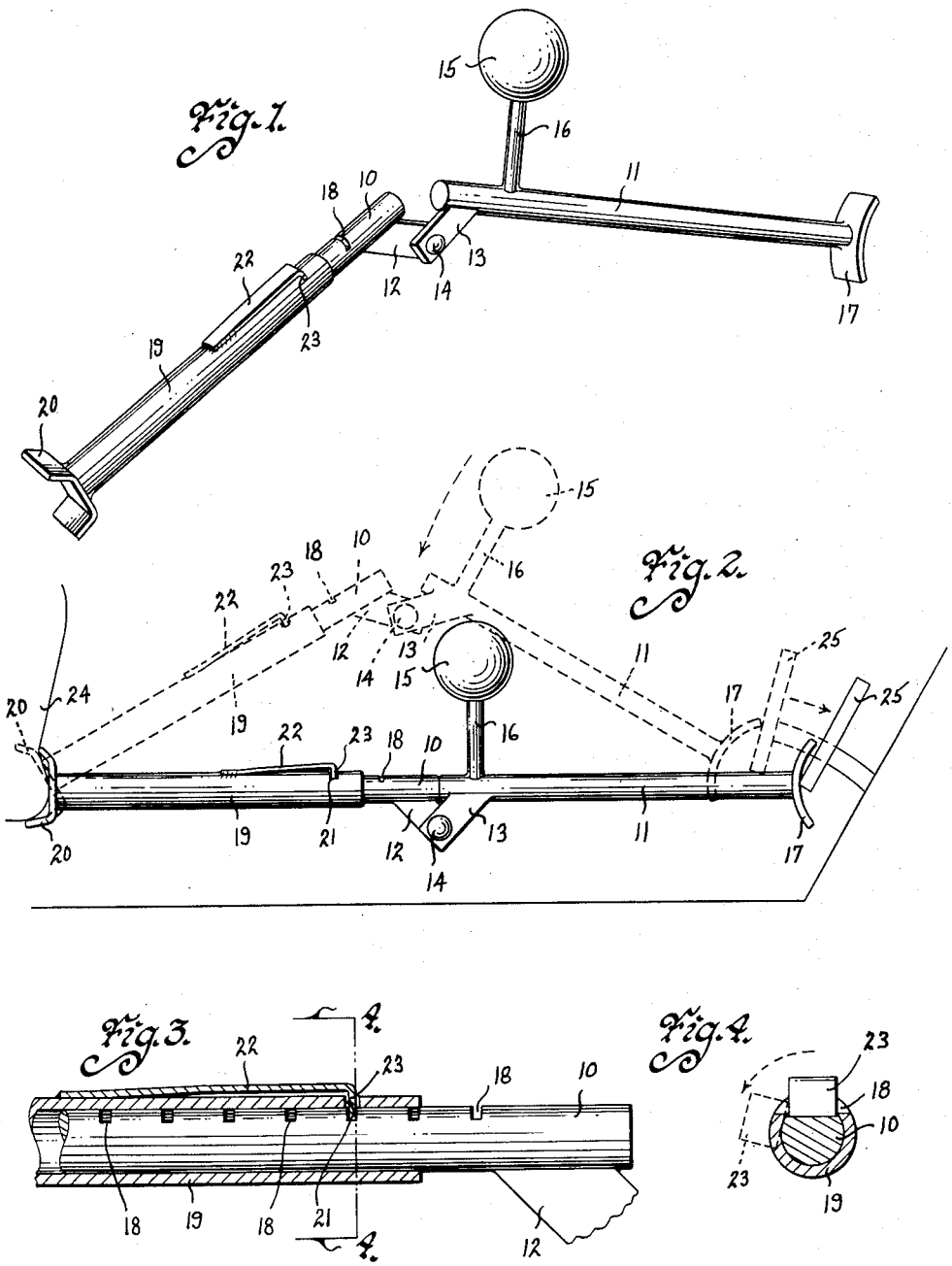

Patented Dec. 15, 1953

2,662,728

UNITED STATES PATENT OFFICE 2,662,728

BRAKE PEDAL HOLDING DEVICE

Roger A. Hanes and Herman E. Luebbers,
Fort Dodge, Iowa

Application May 21, 1951, Serial No. 227,378

4 Claims. (Cl. 254—119)

Our invention relates to a tool for use in depressing and holding the brake pedal on an automotive vehicle.

The use of a brake pedal holding device has a special purpose when it is necessary to change a flat tire on a vehicle. It is usually desirable when changing a tire to block the wheels, if blocks or the like are available, in order to prevent any movement of the vehicle after the jack is in place. The emergency or hand brake can of course be set but this is only operative on the rear wheels. However, the foot brake on cars of modern make are operable on all four wheels and consequently if this pedal is held depressed not only are all wheels locked so as to avoid the necessity for using blocks, but the locking of the wheel on which the tire is to be changed facilitates the work involved since it is easier to loosen and tighten the nuts on a wheel that is not free to rotate.

When a vehicle must be stopped at night on a traveled road due to a flat tire, the depression of the foot brake pedal while the tire is being changed serves another purpose that probably outweighs those previously mentioned. This results from the fact that practically all automotive vehicles today have at least one red stop light or other warning light on the rear that flashes on in response to the operation of the foot brake. Consequently, if this pedal is held depressed, the person changing the tire has not only the advantages above enumerated but he is also automatically provided with a safety device in the form of the burning rear stop light.

Therefore, with these matters in mind it is an object of our invention to provide a tool that can be placed between the bottom of the front seat and the foot brake pedal on an automotive vehicle and manually wedged therein to depress the brake pedal and hold it in that position until the tool is manually removed.

A further object of our invention is to provide a tool of the above class that consists generally of two rod members hingably secured in longitudinal alignment so that when the respective free ends are engaged with the brake pedal and bottom of the front seat, a downwardly pressure at the hinged section to a past center point will cause the ends of this tool to bear against its points of contact whereby the brake pedal will be depressed and this tool cannot be removed until the hinged section is moved upwardly past the center of the longitudinal alignment of the rod members.

A still further object of this invention is to provide a brake pedal holding device as described above in which one of the rod members has a telescoping tubular portion with a locking means to adjust it longitudinally on its support rod so that the overall length of this device can be selectively varied as may be required due to different distances between the seat and brake pedal in different vehicles.

Still another object of our invention is to provide a brake pedal holding tool that can be quickly and easily put into operable position or removed therefrom and quickly adjusted as to length when necessary.

These and other objects will be apparent to those skilled in the art.

Our invention consists in the construction, arrangement, and combination of the various parts of the device, whereby the objects contemplated are attained as hereinafter more fully set forth, pointed out in our claims, and illustrated in the accompanying drawings, in which:

Fig. 1 is a perspective view of our invention ready for use,

Fig. 2 is a side elevational view showing it in operational engagement with a brake pedal and seat portion of a vehicle and with the broken lines indicating its position when being arranged to be put into operable position, Fig. 3 is a fragmentary side view partly in longitudinal section of one of the rod elements of this tool showing its construction for longitudinal adjustment, and Fig. 4 is a cross-sectional view of this device taken on the line 4—4 of Fig. 3.

Referring to the drawings we have used the numerals 10 and 11 respectively to designate two elongated rod members that are hingably secured in longitudinal alignment as illustrated in Fig. 1. For purposes of this hinged connection we provide the bar members 12 and 13 respectively that are secured near the respective adjacent ends of the rod members 10 and 11 and extend outwardly and downwardly therefrom. Each free end of each bar 12 and 13 is provided with an opening so that these two bars can be hingedly or pivotally secured by a pin 14. A knob handle 15 is held spaced above the rod member 11 by the support rod 16, and an arcuate shoe member 17 is secured to the free end of the rod member 11.

A plurality of notches 18 are formed in the rod member 10 transversely its length and arranged in longitudinal spaced relationship thereon. Slidably and rotatably arranged on the rod member 10 is the tubular extension member 19 that has a modified channel shaped shoe 20 secured to its outer or free end. Near the open end of the tubular extension 19 we provide a transverse slot 21. The numeral 22 designates a spring latch or locking means consisting of a length of bar spring material having one end turned downwardly at approximately right angles to form the lip portion 23. This latch is secured to the outer side of the tubular member 19 so that the lip portion 23 will normally yieldingly extend downwardly through the slot 21.

Thus constructed and arranged this tool will operate in the following manner to depress the brake pedal on a motor vehicle and hold it there. Figure 1 shows the position of this device when it is ready to be used. The shoe 20 is placed along the bottom of the front seat 24 of the vehicle in line with the foot pedal. The shoe 17 is engaged with the brake pedal 25 and thus arranged the tool will be in the position shown by the broken lines in Figure 2. The handle 15 is then manually grasped and pushed downwardly until the tool is in position illustrated by the solid lines of Figure 2.

The hinged connection between the rod members 10 and 11 is in effect a toggle action for in its operable position the adjacent ends of the rod members 10 and 11 will be bearing against each other and will be slightly below center relative to their hinge point. In this position the tool cannot be released until an upward pull is exerted on the handle or at the pivot point. The tendency of the brake pedal to return to inoperable position due to its usual return spring attachment will not unseat this tool for the reason that first the return spring cannot overcome the holding force of this tool and secondly since the brake pedal would normally travel in an upward arc any tendency of it to return would merely accentuate holding the pivot point of this tool below its center relative to the longitudinal alignment of the rods 10 and 11.

The tubular extension member 19 provides an exceedingly simple and easy means for adjusting this tool as to length so that it can be used on different vehicles having different lengths from front seat to brake pedal. As shown in Figure 2 the lip portion 23 of the latch will normally seat and lock in one of the notches 18. To extend or retract the extension member 19 on the rod member 10 it is necessary merely to manually rotate the member 19 as shown in Figure 4 and as this is done the lip portion 23 will automatically be raised by a cam action until it rests on a portion of the rod member 10 not intersected by any notches. The extension can then be moved inwardly or outwardly to the desired length and then rotated again until the lip engages itself with the selected notch.

When not in use the shoe members 17 and 20 can be pulled adjacent each other due to the pivot arrangement between the rod members 10 and 11 and thus it forms a small compact unit for storage or transporting.

Some changes may be made in the construction and arrangement of our brake pedal holding device without departing from the real spirit and purpose of our invention, and it is our intention to cover by our claims, any modified forms of structure or use of mechanical equivalents which may be reasonably included within their scope.

We claim:

1. In a brake pedal holding device, a tubular member having a slot therein near one of its ends, a seat frame engaging element secured to the other end of said tubular member, a spring catch secured to the outside of said tubular member and having its end extending into the slot in said tubular member, a notched rod in said tube and slidable therein when said notches are misaligned with said spring catch, a rod member, an arcuate shoe secured to one end of said rod, a hinge bar secured to the other end of said rod, a hinge bar secured to one end of said notched rod; said hinge bars extending beyond the end of said rods and having holes therein that are beyond the ends of said rods, a pin extending through the holes in said hinge bars and securing them together hingedly, and a handle rigidly secured to one of said rods and extending therefrom a substantial distance.

2. In a brake pedal holding device, a tubular member having a slot therein near one of its ends, a seat frame engaging element secured to the other end of said tubular member, a spring catch secured to the outside of said tubular member and having its end extending into the slot in said tubular member, a notched rod in said tube and slidable therein when said notches are misaligned with said spring catch, a rod member, an arcuate shoe secured to one end of said rod, a hinge bar secured to the other end of said rod, a hinge bar secured to one end of said notched rod; said hinge bars extending beyond the end of said rods and having holes therein that are beyond the ends of said rods, a pin extending through the holes in said hinge bars and securing them together hingedly, and a handle rigidly secured to one of said rods and extending therefrom a substantial distance; the notches in said notched rod being straight sided.

3. A brake pedal holding device as set out in claim 2 further characterized by said handle extending from said rods in the plane of hinging movement.

4. A brake pedal holding device as set out in claim 1 further characterized by having said hinge bars and said handle extending from said rods in the plane of hinging movement.

ROGER A. HANES.
HERMAN E. LUEBBERS.

References Cited in the file of this patent

UNITED STATES PATENTS

| Number | Name | Date |
|---|---|---|
| 74,576 | Myers | Feb. 18, 1868 |
| 790,653 | Notthoff | May 23, 1905 |
| 926,479 | Freye | June 29, 1909 |
| 1,558,854 | Falconer | Oct. 27, 1925 |
| 1,813,426 | Russel et al. | July 7, 1931 |
| 2,171,832 | Hoeppner | Sept. 5, 1939 |